United States Patent
Inanc et al.

(10) Patent No.: US 10,185,052 B2
(45) Date of Patent: Jan. 22, 2019

(54) CONSTRAINED BACKSCATTER GAMMA RAY CASING AND CEMENT INSPECTION TOOL

(71) Applicant: BAKER HUGHES INCORPORATED, Houston, TX (US)

(72) Inventors: Feyzi Inanc, Spring, TX (US); Douglas Patterson, Magnolia, TX (US); Elizaveta Onegova, Houston, TX (US); Rocco DiFoggio, Houston, TX (US); Otto Fanini, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/383,978

(22) Filed: Dec. 19, 2016

(65) Prior Publication Data
US 2018/0172876 A1    Jun. 21, 2018

(51) Int. Cl.
*G01V 5/12* (2006.01)
*G01V 5/04* (2006.01)

(52) U.S. Cl.
CPC .............. *G01V 5/045* (2013.01); *G01V 5/12* (2013.01)

(58) Field of Classification Search
CPC ........ G01V 1/104; G01V 1/101; G01V 1/107; G01V 5/045; G01V 5/12
See application file for complete search history.

(56) References Cited

U.S. PATENT DOCUMENTS

| 3,321,627 | A | 5/1967 | Tittle |
| 4,064,440 | A | 12/1977 | Roder |
| 5,763,886 | A | 6/1998 | Schulte |
| 5,912,460 | A | 6/1999 | Stoller et al. |
| 6,896,056 | B2 | 5/2005 | Mendez et al. |

(Continued)

OTHER PUBLICATIONS

Abdul-Majid, Samir et al., "Underwater Pipe Wall Thickness Measurements by Gamma Backscattering," retrieved on Aug. 30, 2016 from: http://www.ndt.net/article/mendt2012/papers/NDT-040.pdf (Jan. 2012).

(Continued)

*Primary Examiner* — David Porta
*Assistant Examiner* — Faye Boosalis
(74) *Attorney, Agent, or Firm* — Mossman, Kumar & Tyler, PC

(57) ABSTRACT

Methods, systems, devices, and products for estimating at least one parameter of interest of a volume of interest of an earth formation using nuclear radiation based measurements. Logging tools include a limited aperture collimated radiation beam source, detectors, and at least one processor configured to take measurements. The source is configured to emit a beam of radiation radially from the logging tool into an elongated volume of interest outside the wellbore such that the beam penetrates a plurality of zones of the volume of interest. Each zone represents a range of radial depths corresponding to a respective infrastructure component associated with the wellbore, such as nested tubulars. Each detector has a unique angle of detection and is configured to generate measurement information in response to spatially coherent backscattered gamma rays. Each detector is associated with scattering events at one of the plurality of zones.

30 Claims, 9 Drawing Sheets

(56) References Cited

U.S. PATENT DOCUMENTS

| | | |
|---|---|---|
| 7,403,000 B2 | 7/2008 | Barolak et al. |
| 7,525,872 B2 | 4/2009 | Tang et al. |
| 7,555,099 B2 | 6/2009 | Rothschild et al. |
| 7,787,327 B2 | 8/2010 | Tang et al. |
| 7,795,864 B2 | 9/2010 | Barolak et al. |
| 8,061,206 B2 | 11/2011 | Bolshakov et al. |
| 8,138,471 B1 | 3/2012 | Shedlock et al. |
| 8,788,207 B2 | 7/2014 | Pei et al. |
| 8,824,632 B2 | 9/2014 | Mastronardi |
| 8,873,711 B2 | 10/2014 | Engelbart et al. |
| 9,103,196 B2 | 8/2015 | Zhao et al. |
| 9,335,437 B2 | 5/2016 | Beekman et al. |
| 2008/0061225 A1 | 3/2008 | Orban et al. |
| 2010/0017134 A1 | 1/2010 | Steinman et al. |
| 2010/0204971 A1 | 8/2010 | Yin et al. |
| 2011/0284732 A1 | 11/2011 | Korkin et al. |
| 2013/0261794 A1 | 10/2013 | Fauci |
| 2014/0052376 A1 | 2/2014 | Guo et al. |
| 2014/0254764 A1 | 9/2014 | Safinya et al. |
| 2014/0374582 A1 | 12/2014 | Guo et al. |
| 2015/0108339 A1 | 4/2015 | Guo et al. |
| 2017/0218749 A1* | 8/2017 | Lee ..................... E21B 44/005 |

OTHER PUBLICATIONS

Rourke, Marvin et al., "Multi-Tubular Corrosion Inspection Using a Pulsed Eddy Current Logging Tool," IPTC 16645, Int'l Petroleum Technology Conference, Beijing, CN (Mar. 2013).

* cited by examiner

CONSTRAINED BACKSCATTER GAMMA RAY CASING AND CEMENT INSPECTION TOOL

FIELD OF THE DISCLOSURE

This disclosure generally relates to borehole logging methods and apparatuses for estimating formation properties using nuclear radiation based measurements.

BACKGROUND OF THE DISCLOSURE

Oil well logging has been known for many years and provides an oil and gas well driller with information about the particular earth formation being drilled. In conventional oil well logging, during well drilling and/or after a well has been drilled, a nuclear radiation source and associated nuclear radiation sensors may be conveyed into the borehole and used to determine one or more parameters of interest of the formation. A rigid or non-rigid conveyance device is often used to convey the nuclear radiation source, often as part of a tool or a set of tools, and the carrier may also provide communication channels for sending information up to the surface. Tools for acoustically inspecting casing and cement integrity, and otherwise evaluating casing, cement, or the bond between them are also known.

SUMMARY OF THE DISCLOSURE

In aspects, the present disclosure is related to methods and apparatuses for estimating at least one parameter of interest of a volume of interest of an earth formation using nuclear radiation based measurements. Apparatus embodiments include a logging tool for conveyance in a wellbore on a carrier. The logging tool may include a radially oriented limited aperture collimated radiation beam source configured to emit, while in the wellbore, a beam of radiation radially from the logging tool into an elongated volume of interest outside the wellbore such that the beam penetrates a plurality of zones of the volume of interest, wherein each zone of the plurality represents a range of radial depths corresponding to a respective infrastructure component associated with the wellbore; a plurality of radiation detectors, wherein each detector of the plurality has a unique angle of detection, the plurality of radiation detectors configured to generate measurement information in response to spatially coherent backscattered gamma rays from the plurality of zones, wherein each detector of the plurality is associated with scattering events at one of the plurality of zones; and at least one processor configured to take well logging measurements with the logging tool. Taking measurements may include using the beam source to emit the beam; generating measurement information at the plurality of detectors responsive to the emitted beam; and estimating a property of the respective infrastructure component at at least one zone using the measurement information.

The source may be at substantially the same borehole depth as the plurality of detectors. The volume of interest may comprise a plurality of nested tubulars in the wellbore, and the infrastructure component comprises a structural feature relating to at least one tubular of the plurality of nested tubulars. At least one tubular of the nested tubulars may include cement adjacent to casing. The property of the respective infrastructure component may include at least one property of a defect of the component. The processor may be further configured to identify an anomaly in the infrastructure by detecting attenuated backscatter at a detector correlated with a corresponding zone. The apparatus may include a carrier, which may comprise at least one of i) a drill string; and ii) a wireline.

Method embodiments may include conveying the logging tool in the wellbore on a carrier; taking well logging measurements with the logging tool, including emitting a beam of radiation having high spatial coherency radially from the logging tool into a collimated volume of interest outside the wellbore such that the beam penetrates a plurality of zones of the volume of interest, wherein each zone of the plurality represents a range of radial depths corresponding to a respective infrastructure component associated with the wellbore; generating measurement information at a plurality of detectors on the logging tool in response to spatially coherent backscattered gamma rays from the plurality of zones, wherein each detector of the plurality is associated with scattering events at one of the plurality of zones; and estimating a property of the respective infrastructure component at at least one zone using the measurement information.

The volume of interest may include a plurality of nested tubulars in the wellbore, and the infrastructure component comprises a structural feature relating to at least one tubular of the plurality of nested tubulars. At least one tubular of the nested tubulars may comprise cement adjacent to casing. The property of the respective infrastructure component may be at least one property of a defect of the component.

Methods may further include estimating the property of the respective infrastructure component at a zone by using measurement information from another zone closer to a longitudinal axis of the tool than the zone to mitigate effects on measurement information from the zone comprising correcting for an influence of the other zone on the beam. Methods may include performing an inversion on measurement information for at least the zone and the other zone. Methods may include performing an inversion on measurement information for the at least one zone at a plurality of wellbore depths. Each detector may be configured with an angle of detection aligned with a corresponding zone of the plurality of zones. Methods may include identifying an anomaly in the infrastructure by detecting attenuated backscatter at a detector correlated with a corresponding zone. Methods may include modeling a predicted signal response for each detector corresponding to at least one anomaly; and comparing the information with the predicted signal response to identify the anomaly.

Methods may include conducting further operations in dependence upon the property. The further operations may include at least one of: i) geosteering; ii) drilling additional wellbores in the formation; iii) performing additional measurements on the formation; iv) estimating additional parameters of the formation; v) installing equipment in the wellbore; vi) repairing infrastructure; vii) optimizing present or future development in the formation or in a similar formation; viii) optimizing present or future exploration in the formation or in a similar formation; and ix) producing one or more hydrocarbons from the formation.

Estimating the property of the respective infrastructure component may include performing a joint inversion using the measurement information and additional measurement information from an additional tool comprising at least one of: i) an electromagnetic tool, and ii) an acoustic tool to resolve a structural feature relating to at least one tubular of the plurality of nested conductive tubular. The structural feature may comprise at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; and viii) a material property of a material surrounding the at least one tubular.

Estimating the property of the respective infrastructure component may include performing a sequential inversion using the measurement information and additional measurement information from an additional tool to resolve a structural feature relating to at least one tubular of the plurality of nested conductive tubular. The structural feature may comprise at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; and viii) a material property of a material surrounding the at least one tubular. The additional tool may comprise at least one of: i) an electromagnetic tool, and ii) an acoustic tool.

Estimating the property of the respective infrastructure component may comprise performing a first inversion, and using the results of the first inversion as a constraint for a second inversion, wherein at least one of the first inversion and the second inversion is performed using the measurement information.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

In aspects, this disclosure relates to well logging using a logging tool in a wellbore in an earth formation. In some aspects, this disclosure relates to estimating a property of one or more infrastructure components associated with the wellbore using radiation information from a volume of interest including the infrastructure components. The property of the respective infrastructure component may be at least one property of a defect of the component, such as presence or dimensions of the defect.

The infrastructure components of the volume of interest may be a plurality of nested conductive tubulars in the wellbore (also referred to as a borehole). The property corresponding to each conductive tubular may include at least one of: i) location of the tubular; ii) thickness of the tubular; and iii) at least one property of a defect of the tubular.

Inspection of underground tubular is well known. Vast subterranean networks of installed tubular may suffer from defects at particular, but unpredictable, points. Detection of these defects are highly desirable. One prominent application is the detection of corrosion defects in downhole casing and tubing strings. Logging such strings is often the best (sometimes only) means of detecting these defects. Another application can be determining the type of material between the casing strings.

Acoustic inspection of such infrastructure components is well known. Casing and cement evaluation via acoustic measurement usually relies on detection of resonance frequency and signal amplitude decays to assess casing and cement thickness and integrity, and quality of the bond between casing cement.

Unfortunately, at ultrasonic frequencies needed for requisite resolution, conventional acoustic signals cannot penetrate below the skin of the innermost tubular, in part because of the lower resonance frequency of the acoustic system represented by the multiple liner installation, while lower frequencies suffer from insufficient directivity for detection of corrosion defects. Further, a multiple tubular system (e.g., inner and outer casings) may have more than three resonance modes—resonance from each casing, resonances from the composite system, and harmonic resonances—making accurate detection of defects in the casing or cement problematic.

Aspects of the present disclosure relate to tools, systems, and methods to inspect infrastructure components in a double casing completion (e.g., casing, cement between two casings, and cement behind the outer casing) based on backscattered gamma rays resulting from gamma rays emitted by a gamma ray source on the logging tool.

Figure 1:
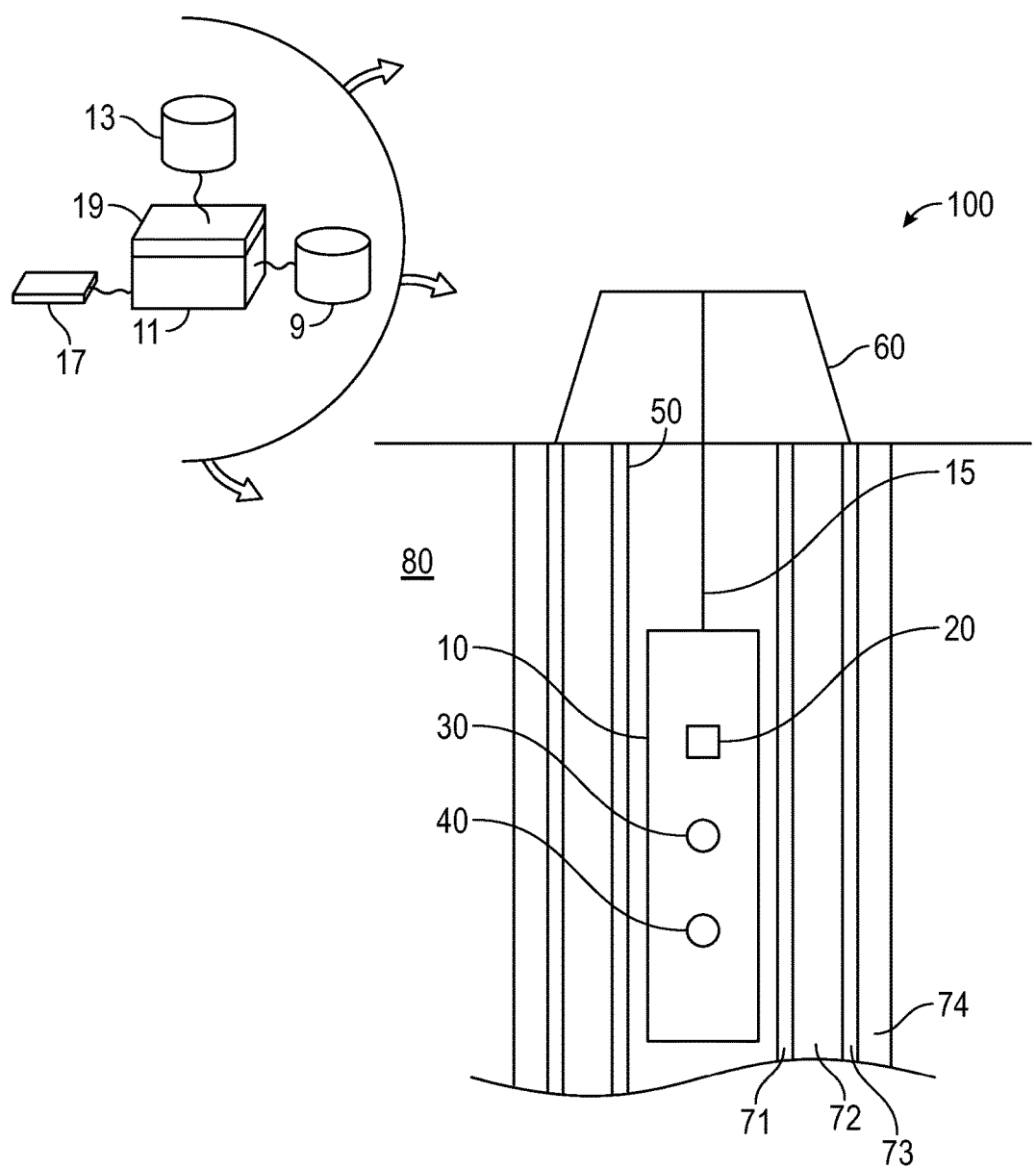
FIG. 1 schematically illustrates a system having a downhole tool configured to acquire information in a wellbore intersecting a volume of interest of an earth formation.

FIG. 1 schematically illustrates a system 100 having a downhole tool 10 configured to acquire information in a wellbore 50 intersecting a volume of interest of an earth formation 80 for estimating density, oil saturation, and/or other parameters of interest of the formation 80. The parameters of interest may include information relating to a geological parameter, a geophysical parameter, a petrophysical parameter, and/or a lithological parameter. Thus, the tool 10 may include a sensor array 30 including sensors for detecting physical phenomena indicative of a parameter of interest including sensors for estimating formation resistivity, dielectric constant, the presence or absence of hydrocarbons, acoustic density, bed boundary, formation density, nuclear density and certain rock characteristics, permeability, capillary pressure, and relative permeability.

The system 100 may include a conventional derrick 60 and a conveyance device (or carrier) 15, which may be rigid or non-rigid, and may be configured to convey the downhole tool 10 into wellbore 50 in proximity to formation 80. The carrier 15 may be a drill string, coiled tubing, a slickline, an e-line, a wireline, etc. Downhole tool 10 may be coupled or combined with additional tools. Thus, depending on the configuration, the tool 10 may be used during drilling and/or after the wellbore (borehole) 50 has been formed or completed with infrastructure. For example, the completed wellbore may include inner casing 71, cement between two casings 72, outer casing 73, and cement behind the outer casing 74. While a land system is shown, the teachings of the present disclosure may also be utilized in offshore or subsea applications. The carrier 15 may include embedded conductors for power and/or data for providing signal and/or power communication between the surface and downhole equipment. The carrier 15 may include a bottom hole assembly, which may include a drilling motor for rotating a drill bit.

Tool 10 includes a nuclear detection module 40 for use in infrastructure evaluation in accordance with techniques of the present disclosure. The nuclear detection module 40 includes a radiation source and radiation detectors particularly configured in accordance with embodiments of the present disclosure, described in further detail with respect to FIG. 2 below.

In embodiments, the radiation source 40 emits radiation (e.g., gamma rays) into the volume of interest to be surveyed. In some embodiments, the radiation source 40 may be continuous. In some embodiments, the radiation source 40 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source. The detectors provide signals that may be used to estimate the radiation counts (e.g., gamma ray counts) returning from the formation.

Certain embodiments of the present disclosure may be implemented with a hardware environment that includes an information processor 11, an information storage medium 13, an input device 17, processor memory 19, and may include peripheral information storage medium 9. The hardware environment may be in the well, at the rig, or at a remote location. Moreover, the several components of the hardware environment may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware. When the program is loaded from information storage medium 13 into processor memory 19 (e.g. computer RAM), the program, when executed, causes information processor 11 to retrieve detector information from either information storage medium 13 or peripheral information storage medium 9 and process the information to estimate a parameter of interest. Information processor 11 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics 20 associated with the detectors (described in further detail below with respect to FIG. 2) may be configured to record radiation counts from the plurality of detectors and associated data as radiation information, and to analyze the radiation information. The radiation information may be spectral gamma ray information. This detection may be substantially continuous, which may be defined as occurring within very narrow time bins or windows (less than 1000 microseconds, or less than 10 microseconds). In some embodiments, a parameter of interest may be estimated using a difference between the detector counts. Various properties of the formation may be determined using a time-dependent ratio curve. Herein, the term time-dependent broadly describes the property of the ratio to vary with time, as opposed to a ratio that remains constant.

In other embodiments, such electronics may be located elsewhere (e.g., at the surface, or remotely). To perform the treatments during a single trip, the tool may use a high bandwidth transmission to transmit the information acquired by detectors to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

Figure 2A:
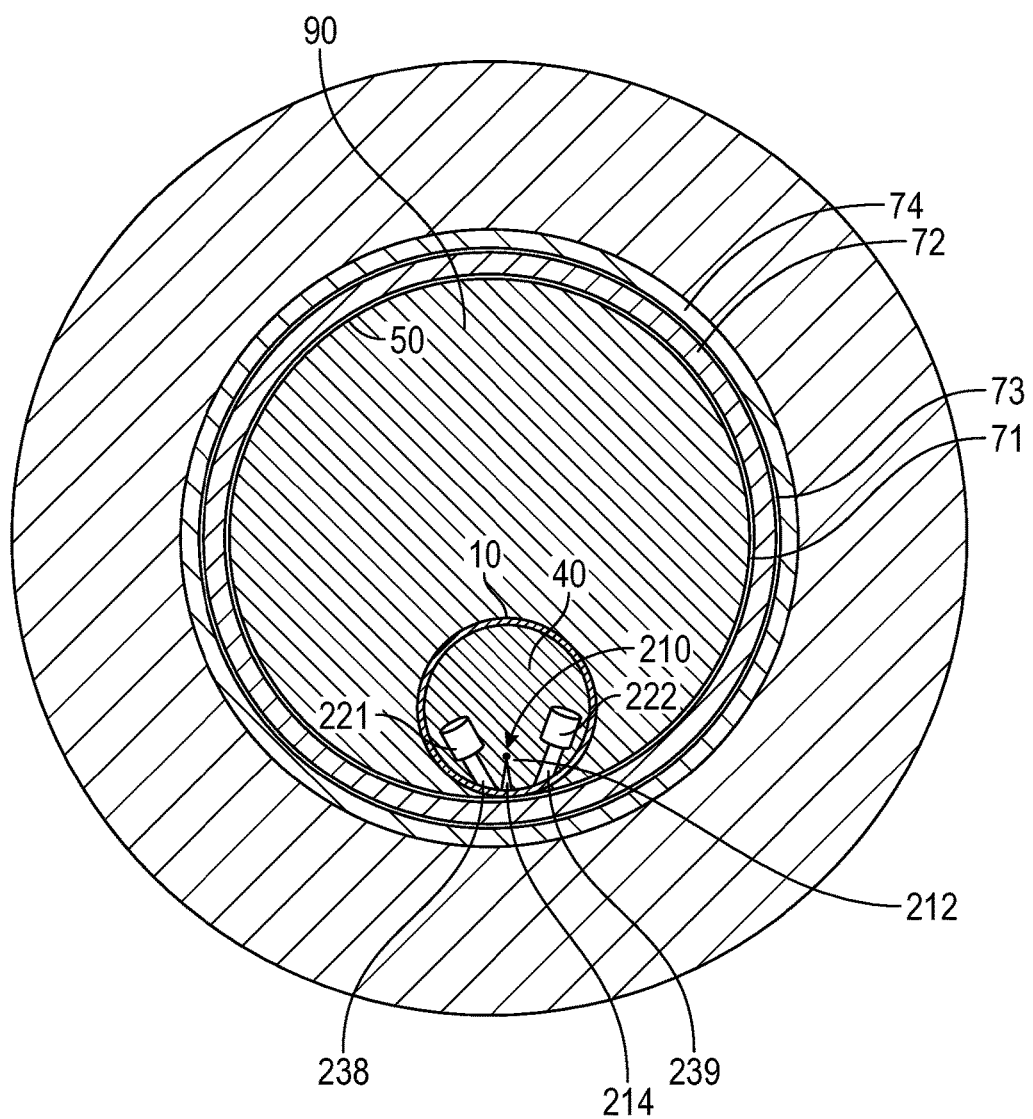
FIGS. 2A-2C show a nuclear detection module as part of an evaluation assembly that may be incorporated in tool in accordance with embodiments of the present disclosure.
Figure 2B:
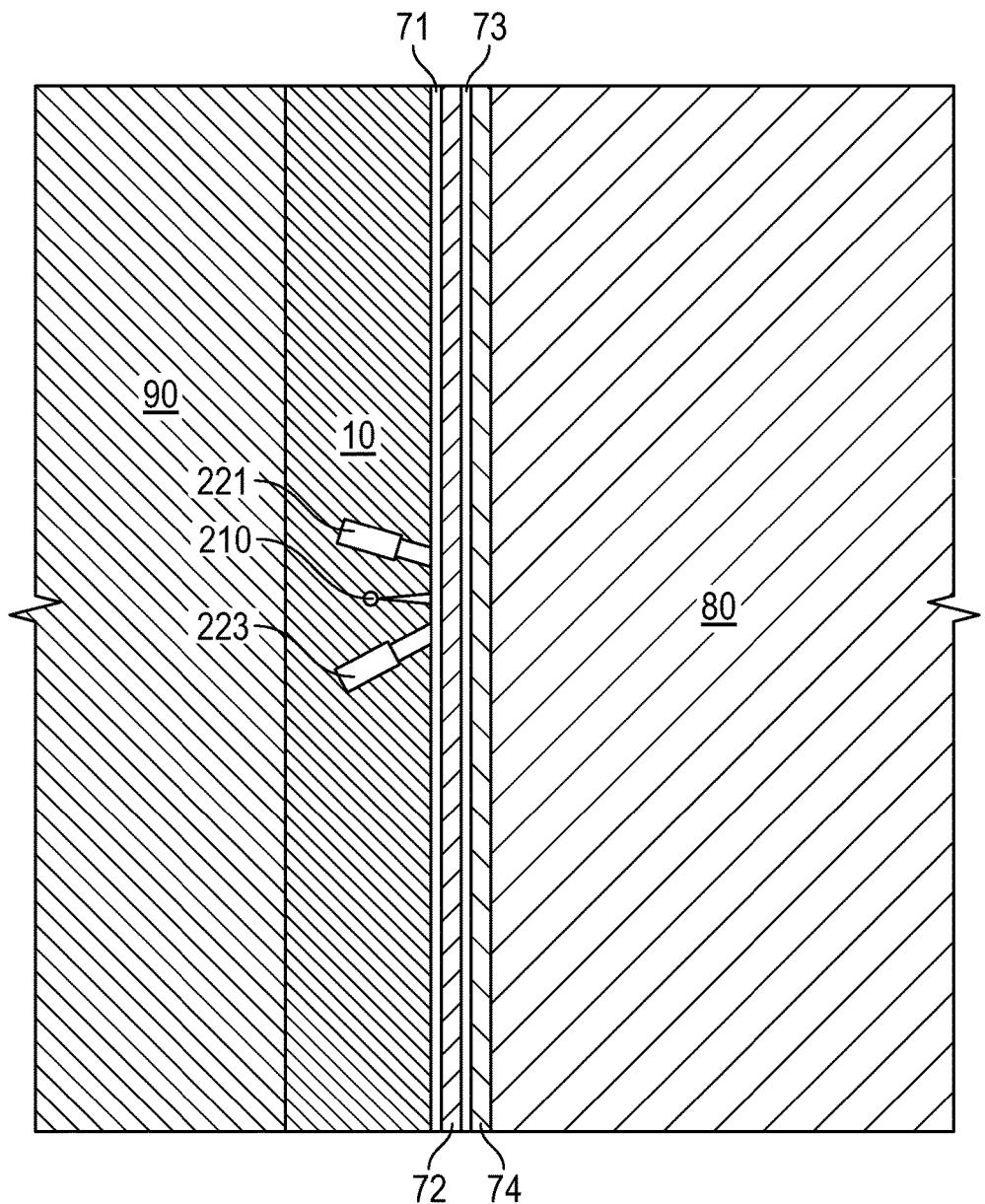
Figure 2C:
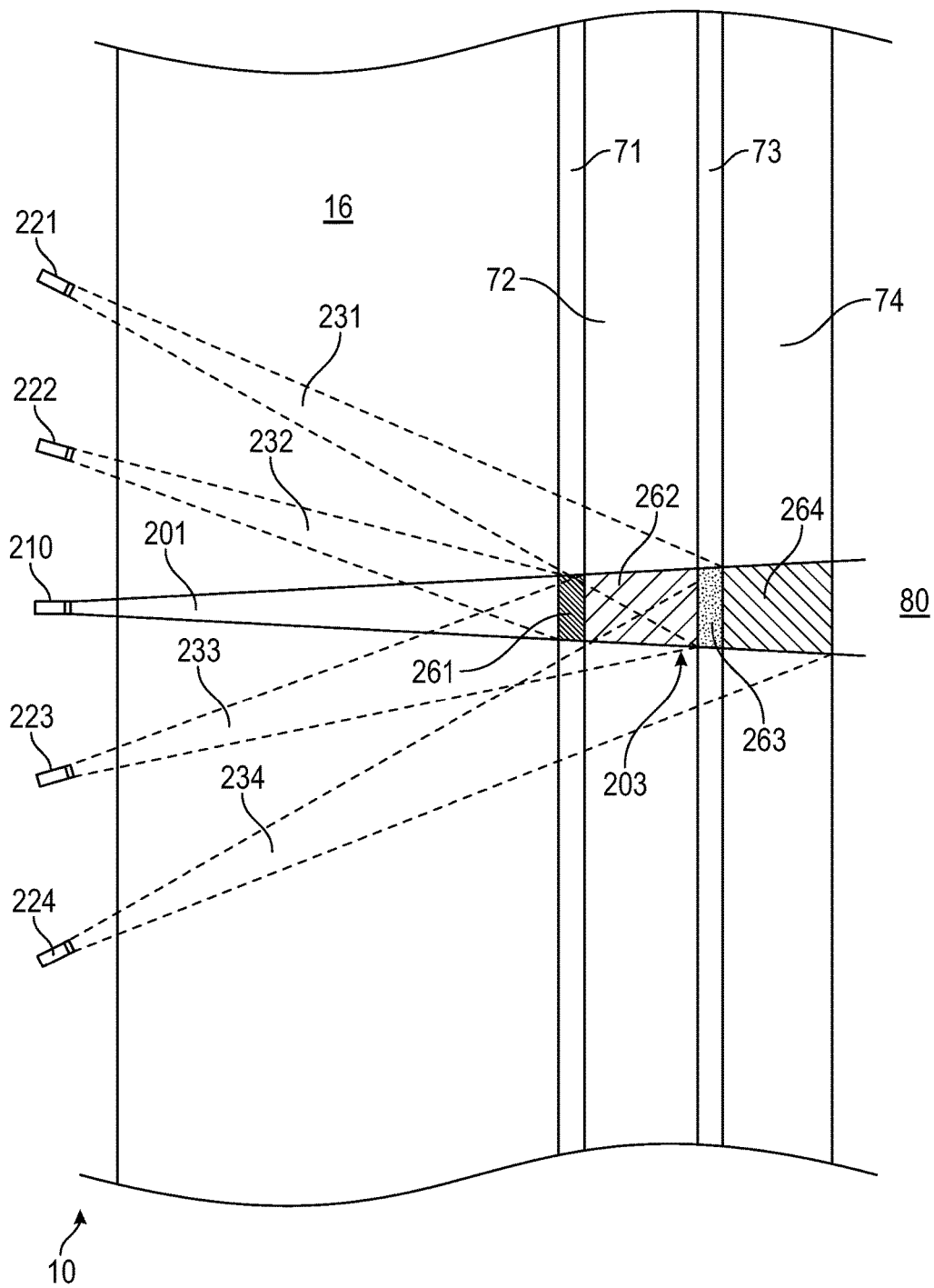

FIGS. 2A-2C show a nuclear detection module 40 as part of an evaluation assembly 200 that may be incorporated in tool 10 in accordance with embodiments of the present disclosure. FIG. 2A illustrates a view of the radial cross-section of the tool in the wellbore. FIG. 2B illustrates a view of the longitudinal cross-section of the tool in the wellbore. The tool resides in the wellbore 50, which may be filled with borehole fluid 90. The nuclear detection module 40 may include a radially oriented limited aperture collimated radiation beam source 210, comprising a gamma ray source 212 and a collimator 214. The gamma ray source 212 may be implemented using a cesium-137 pill or the like, or an x-ray generator or a linear accelerator or gamma rays generated by a material activated by a proximate neutron source, e.g., a target in a neutron generator tube. Collimator 214 may be implemented mechanically or by other methods means known in the art. For example, source 210 may be mounted in a recess in the tool, the recess radially oriented (e.g., substantially perpendicular to the longitudinal axis of the tool 10), with the balance of the recess filled with suitable shielding material substantially opaque to gamma rays (e.g., Hevimet), while a window of gamma transparent material (e.g., resin) extends from the source 210 to the outer end of the recess.

The radiation source 210 may be controllable in that the radiation source may be turned "on" and "off" while in the wellbore (or at the surface), as opposed to a radiation source that is "on" continuously. The measurements performed using this type of radiation may be referred to as "source-less" measurements since they employ a source that may be turned off, as opposed to a continuously emitting chemical radiation source.

The nuclear detection module 40 may also include a plurality of radiation detectors 220. As used herein, the term "radiation detector" relates to instruments that measure incident radiation, and more particularly, incident backscattered gamma radiation. For example, the radiation detector may use a scintillator material that interacts with incident backscattered gamma rays and produces light scintillations (photons) which are in turn detected by a photomultiplier tube coupled to electronics. Exemplary gamma radiation detectors include, without limitation, scintillators using sodium iodide (NaI), cesium iodide (CsI), bismuth germinate (BGO), thallium iodide (TlI), and other organic crystals, inorganic crystals, plastics, solid state detectors, and combinations thereof. The detectors may be configured as spectral gamma ray detectors.

When gamma source 210 is turned on, the source may emit a beam 201 of radiation having high spatial coherency radially from the logging tool into an elongated volume of interest 203 outside the wellbore. The volume of interest 203 includes portions of a plurality of infrastructure components. Thus, segments 261, 262, 263, 264 of the elongated volume of interest 203 correspond to a respective infrastructure component (e.g., casing). The radiation detectors may receive a nuclear radiation response 270 (e.g., backscattered gamma radiation) from the volume of interest.

In contrast to the typical long-spaced (LS) and short-spaced (SS) configuration, in techniques of the present disclosure, the source 210 is at substantially the same borehole depth as the plurality of detectors 220. Approaches typical in the prior art are configured with detectors axially distanced from the source, thereby averaging the response over a large volume. In the techniques of the present disclosure, the detectors are clustered around the source so that the readings are not influenced significantly by the material outside the collimated volume, and to ensure sufficient detections for a signal quality. For example, the detectors may be distributed about the perimeter of the source. Further, the collimated detectors limit the radiation scattered from unwanted regions of the wellbore. Thus, each detector is predominantly sensitive to backscatter radiation from a segment of the volume of interest corresponding to a particular infrastructure component, and minimally affected by properties of the formation outside the segment (or zone).

FIG. 2C illustrates the oriental of components in a tool in accordance with embodiments of the present disclosure. Each detector 221, 222, 223, 224 of the plurality 220 has a unique angle of detection 231, 232, 233, 234. The angle of detection comprises the solid angle of the detector about a longitudinal detector axis and the orientation of the axis. That is, the angle of detection is the solid angle with reference to a particular coordinate system. The signal recorded by each detector corresponds with an overlap of the solid angle of that detector with a corresponding segment 261, 262, 263, 264 of the volume of interest. The solid angle of each of the detectors is tightly collimated to focus on a particular zone corresponding to the segments of the volume interest (in which direction each longitudinal detector axis is respectively oriented), such that each detector predominantly receives backscattered gamma rays from a zone corresponding to a particular infrastructure component.

Thus each detector reads from a specific segment of the gamma-illuminated volume. For example, the volume of interest may include a plurality of nested tubulars in the wellbore, and the infrastructure component may comprise a structural feature relating to at least one tubular of the plurality of nested tubulars (e.g., cement adjacent to casing). In the case of multi-casing completions, a unique detector may be configured to detect backscattered gamma rays from each of inner casing 71, cement between two casings 72, outer casing 73 and cement behind the outer casing 74, respectively.

Thus, each zone of the plurality represents a range of radial depths corresponding to a respective infrastructure component associated with the wellbore; and the tool 10 is thus configured to generate measurement information at the plurality of radiation detectors 220 in response to spatially coherent backscattered gamma rays from the plurality of zones, wherein each detector of the plurality is associated with scattering events at one of the plurality of zones. The orientation and collimation of both gamma ray source and the detectors can be made adjustable to fine tune the segments for wellbores having various dimensions and other properties, e.g., varying borehole and completion sizes. At least one processor (e.g., electronics 20) may be configured to operate the radiation source and the plurality of radiation detectors to generate measurement information, and to estimate a property of the respective infrastructure component at at least one zone using the measurement information.

Figure 3:
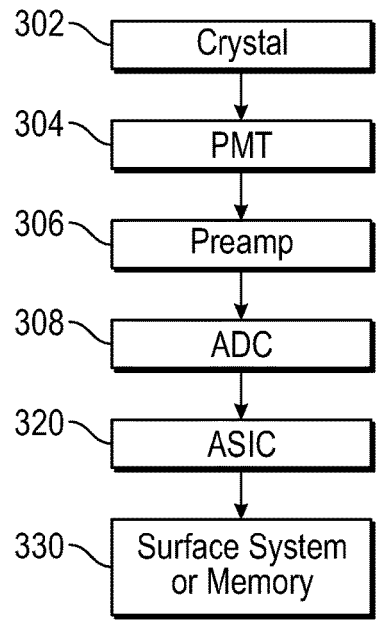
FIG. 3 is a schematic diagram illustrating an example detector architecture in accordance with embodiments of the present disclosure.

FIG. 3 is a schematic diagram illustrating an example detector architecture in accordance with embodiments of the present disclosure. The detector includes a scintillation crystal 302 producing light scintillations responsive to incident radiation. The light interacts with a PMT 304 which produces an analog electrical (e.g., voltage) signal. This signal runs through a preamplifier 306 and analog-to-digital converter ('ADC') 308 in turn. The signal emerging from the ADC 308 is a digital signal, which may be operated on, in turn, by various logic modules of an Integrated Circuit ('IC') 320, implemented, for example, as a field-programmable gate array ('FPGA'), ASIC, or other electronic circuitry. The logic modules may include pulse shaping and pulse detection modules, among others, as known in the art. The IC 320 then sends the measurement information to local or remote memory or to a remote subsystem 330 for display, storage, or further processing.

In the multi-casing example above, the tightly collimated beam propagates through the casings and cement, becoming more attenuated along the length of the beam. The gamma rays will scatter in inner casing, cement between two casings, outer casing and cement behind the outer casing, each of which may be represented as a scattering source. That source can be written as in equation (1).

$$S_{scat}(r,\Omega,E) = \iint \Sigma(r,\dot\Omega \to \Omega, \dot E \to E) I(r,\dot\Omega,\dot E) d\dot E d\dot\Omega \qquad (1)$$

In this equation, S(r, Ω, E) is scattered gamma ray source, Σ(r, Ω')→Ω, E'→E) is a scattering kernel and I(r, Ω, E) is angular gamma ray flux. For a tightly collimated point gamma ray source and homogenous medium, I(r, Ω, E) can be approximated by equation (2).

$$I(r, \Omega, E) \approx \frac{S(E)}{4\pi|r-r_0|^2} e^{-\int \Sigma_t(r-s'\Omega,E)ds'} + \qquad (2)$$

$$\int \left[ \int \int \Sigma(r-s'\Omega, \Omega' \to \Omega, E' \to E) I(r-s'\Omega, \Omega', E') dE' d\Omega' \right]$$

$$e^{-\int \Sigma_t(r-s''\Omega,E)ds''} ds'$$

Although equation (2) is given for a heterogeneous region, it is very straightforward to write the flux term for homogenous or piecewise homogenous regions as well. $\Sigma_t(E)$ in equation (2) is total attenuation cross section for a given energy level, E. S(E) is the intensity of the isotropic point source used to illuminate the casing and the cement structure in the wellbore. This point source can represent gamma rays from radionuclides, x-ray tubes and accelerators and located in a logging tool. Both equations (1) and (2) can be solved through either deterministic radiation transport methods or Monte Carlo methods.

Another relevant concept in this disclosure is the volume of interest. The detectors to be used in this tool are tightly collimated with different size apertures and oriented at different directions. For such cases, the detectors will be exposed to gamma rays scattered from a specific volume of interest. That volume usually has a conic shape although it may not have very distinct boundaries. This acceptance is given by equation (3).

$$I(r_d,E) = \int_{\Delta\Omega} I(r_d,\Omega,E) d\Omega \qquad (3)$$

The solid angle, ΔΩ, in the equation determines the conic volume that is unique to each detector in the tool. Since the gamma ray source is also collimated, it has its own solid angle as well and conic volume of illumination. The volume of interest referred in this disclosure refers to the intersection of the conic volume of the source and the conic volume of the detector.

Referring again to FIG. 2C, the general approach in obtaining an image is to acquire a signal for each zone, such as, for example, zones corresponding to the inner casing (zone 1, 261), cement between two casings (zone 2, 262), outer casing (zone 3, 263), and cement behind the outer casing (zone 4, 264).

Since each detector focuses on a different segment of the volume of interest aligned to the axis normal to the collimated gamma ray source beam, they collectively form a radial depth profile. With the tool moving along the borehole, is an axial profile may be generated as well. With that detector configuration and tool movement, a two-dimensional image may be generated spread over the pixel configuration, as shown in FIGS. 4A & 4B.

Figure 4A:
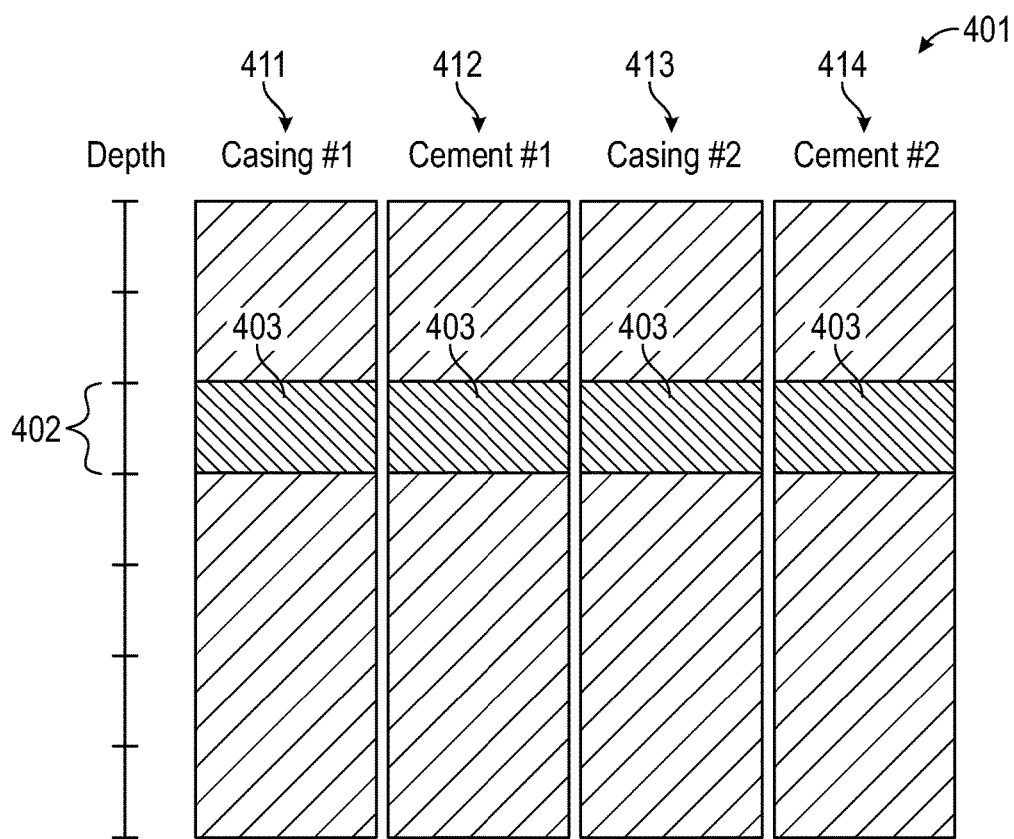
FIGS. 4A & 4B are schematic diagrams illustrating images in accordance with embodiments of the present disclosure.
Figure 4B:
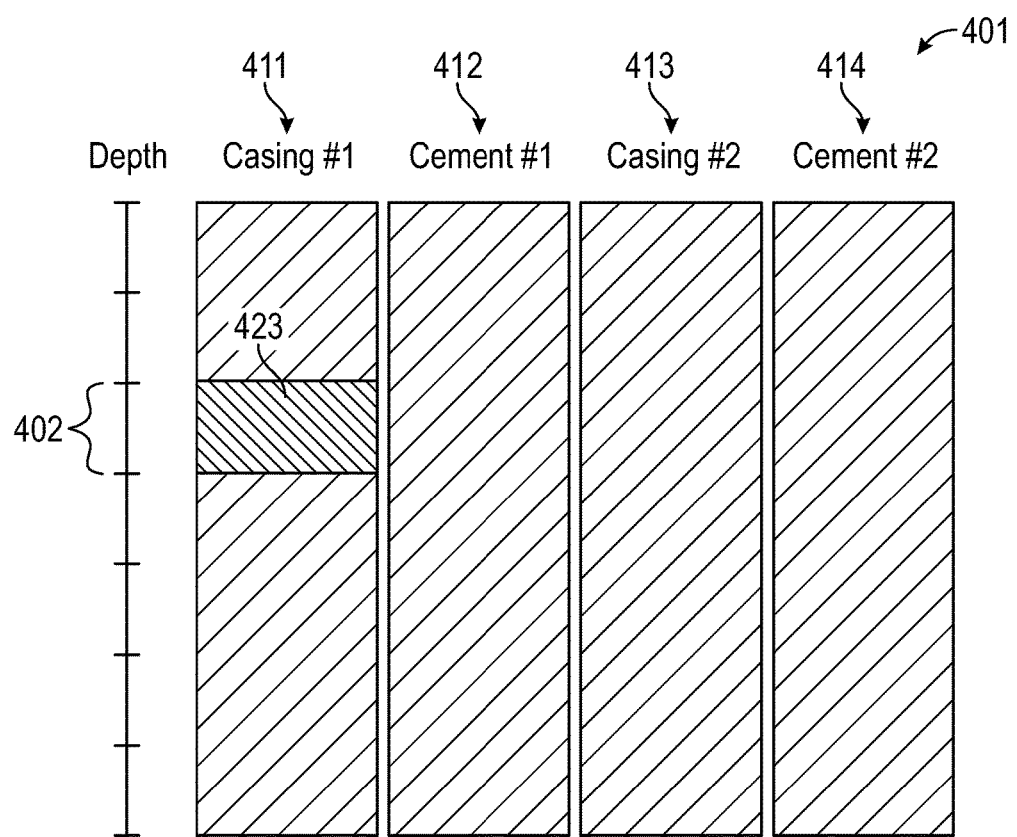

FIGS. 4A & 4B are schematic diagrams illustrating a images in accordance with embodiments of the present disclosure. The first column 411 in the configuration would be for the first casing. The second column 412 would represent the data from the cement. The third column 413 is again from the casing but this time from the second casing. The fourth column 414 would be from the outermost cement layer. Since the casing sizes will be different for different borehole sizes, the collimators employed with the detectors will be adjustable to match the borehole completion properties.

In this specific casing and cement inspection application, the source term would vary as a function of two factors. One of them is the material between the source and the scattering location and the other is the material at the scattering location. Techniques disclosed herein resolve influences from both of those factors. For example, if we read a signal from the cement zone between two casings and it appears anomalous, it is difficult to know if the signal anomaly is due to a corresponding physical anomaly (e.g., change in the cement properties) or if it is due to the changes in the signal caused at a previous, radially interior zone (e.g., casing). Either of these stimuli would change the scattering source and result in the signal for that zone becoming anomalous. For that reason, techniques of the present disclosure include receiving information from each zone so that resolution of the backscattering process can be constrained by using tightly collimated multiple detectors to avoid this uniqueness issue. The signal from any of the volumes of interest above is driven by the incident flux term given below. Physical anomalies may include defects, such as a void corresponding to a defect. The anomaly may also be a volume comprising a material filling the void in the nominal material. It is therefore also desirable to identify an anomaly that may be a gas-filled cavity, or a water-, mud-, or hydrocarbon-occupied cavity.

FIG. 4A is a schematic diagram illustrating a raw image in accordance with embodiments of the present disclosure. The image 401 shows signal variation radially (at various DOI, separated in zones 411, 412, 413, 414) with respect to borehole depth. At depth interval 402 an anomaly 403 (a change in the signal) occurs for all zones. At that point, the change is driven by what is happening in the first zone 411. Upon applying this constraint to the data, the image in FIG. 4B results. FIG. 4B is a schematic diagram illustrating a processed image in accordance with embodiments of the present disclosure. Anomaly 423 occurs only in zone 411. With this approach, it is possible to remove the non-unique condition and determine if the signal is "real" (reflective of the zone property) or if it is driven by what is happening in the other zones.

Figure 5:
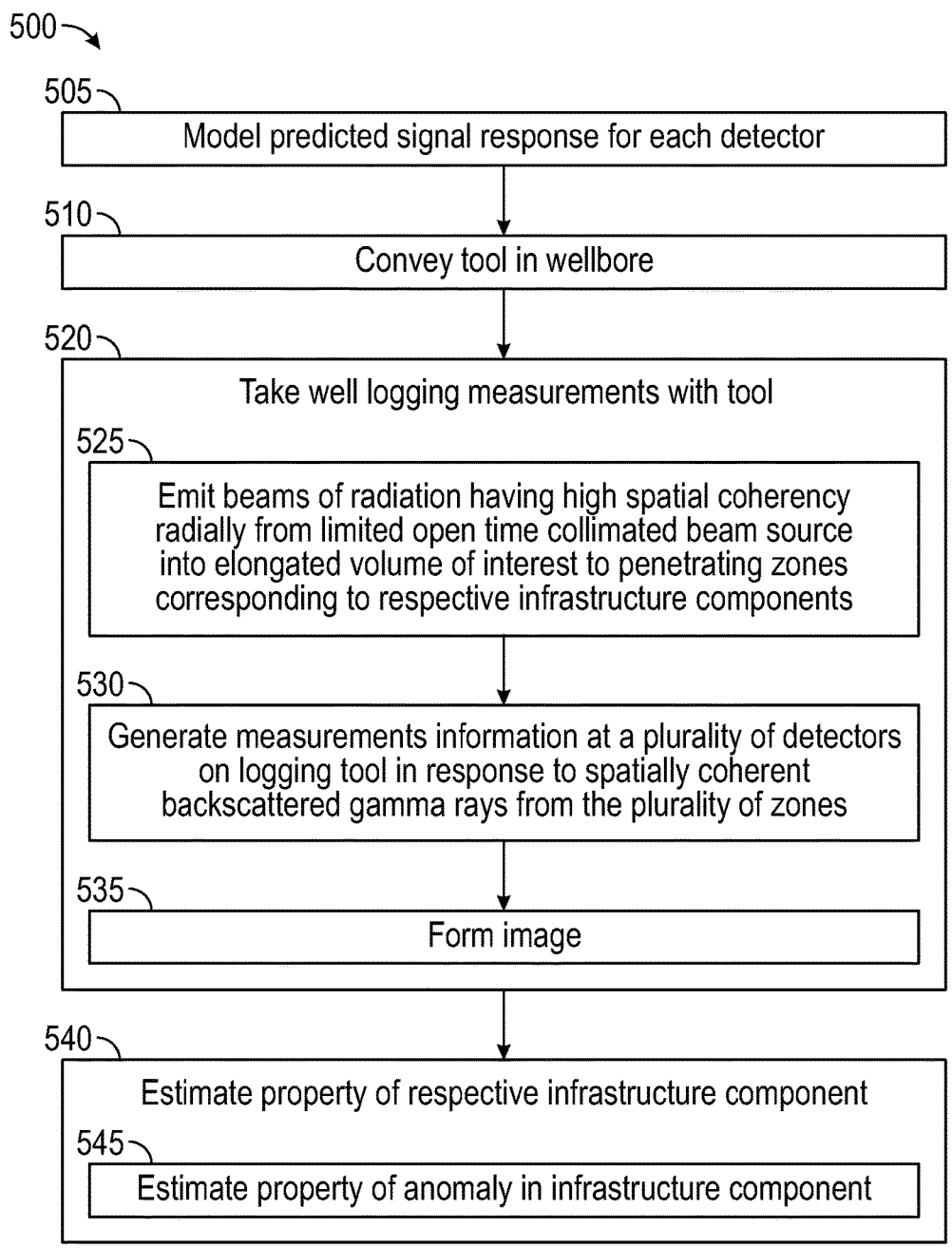
FIG. 5 shows a flow chart for estimating at least one parameter of interest of the earth formation according to one embodiment of the present disclosure.

FIG. 5 shows a flow chart 500 for estimating at least one parameter of interest of the earth formation according to one embodiment of the present disclosure. In step 510, the logging tool is conveyed in a wellbore in an earth formation. At step 520, well logging measurements are taken with the logging tool. Measurement may be taken at a plurality of borehole depths and azimuths. Step 520 comprises substeps 525, 530, and 535. Substep 525 includes emitting a beam of radiation having high spatial coherency radially from the logging tool into a collimated volume of interest outside the wellbore such that the beam penetrates a plurality of zones of the volume of interest, wherein each zone of the plurality represents a range of radial depths corresponding to a respective infrastructure component associated with the wellbore. Substep 530 includes generating measurement information at a plurality of detectors on the logging tool in response to spatially coherent backscattered gamma rays from the plurality of zones, wherein each detector of the plurality is associated with scattering events at one of the plurality of zones. Signals are generated via scintillation responsive to incident gamma rays or other radiation. The signals, representing nuclear radiation, may be normalized by applying a correction factor. The correction factor may be determined in dependence upon an estimated lithology of the formation containing the radionuclide and a model relating nuclear density and lithology.

At substep 535, an image is formed from the information. The image may have radial and axial dimensions. For example, a radial image may be generated over a plurality of borehole depth intervals. The radial images may be concatenated to form a two-dimensional image.

Step 540 comprises estimating a property of the respective infrastructure component at at least one zone using the measurement information. Step 540 may include estimating the property of the respective infrastructure component at a zone by using measurement information from another zone closer to a longitudinal axis of the tool than the zone to mitigate effects on measurement information from the zone comprising correcting for an influence of the other zone on the beam. Step 540 may include performing an inversion on measurement information for at least the zone and the other zone. It may include performing an inversion on measurement information for the at least one zone at a plurality of wellbore depths. The inversion may be based on radiation transport modeling through either deterministic or Monte Carlo approaches, or one of many other approaches known in the art. Depending on the pixel size along the axial depth, each row can be inverted individually or it can be inverted by using data from adjacent rows.

The property may be the presence of an anomaly. For example, this may include identifying an anomaly in the infrastructure by detecting attenuated backscatter at a detector correlated with a corresponding zone. The anomaly may be related to a defect. Step 540 may include step 545, estimating a property of the anomaly. Optional step 505 may include modeling a predicted signal response for each detector corresponding to at least one anomaly, and step 545 may include comparing the information with the predicted signal response to identify the type of the anomaly. For example, step 545 may be carried out by comparing pixel values to modeled values for assignment of a material type to each pixel. The casing and cement may be evaluated based on the assigned pixel data values.

Other preliminary steps may include adjusting the configuration of the tool for the dimensions of the wellbore and associated infrastructure, such as, for example, by adjusting the collimators. This may begin with choosing the right collimation settings for the detectors so that right depth profile can be formed correlating with the predicted dimensions of the completion components. That is, the collimation settings may be configured so that each zone substantially corresponds to the radial depth interval of a particular completion component of the wellbore infrastructure. This may be followed by estimating the signal from each pixel for a pixel representing a physical infrastructure component in good condition. The modeling can be used for determining the type of signal to be received for different types of anomalies. For example, the interactions at an irradiated zone comprising good cement, no cement with gas in place, no cement with light mud in place, no cement with heavy mud in place, and so on can be modeled, and the signal from those predicted.

Since a gamma ray count may include gamma rays from multiple elements, the gamma ray count information may be separated using a model into gamma ray components associated with each element. Herein, "information" may include raw data, processed data, analog signals, and digital signals. In some embodiments, the model may include, but is not limited to, one or more of: (i) a mathematical equation, (ii) an algorithm, (iii) an energy spectrum deconvolution technique, (iv) a stripping technique, (v) an energy spectrum window technique, (vi) a time spectrum deconvolution technique, and (vii) a time spectrum window technique.

In some embodiments, estimation of the parameter of interest may involve applying a model. The model may include, but is not limited to, (i) a mathematical equation, (ii) an algorithm, (iii) an energy spectrum deconvolution technique, (iv) an energy spectrum stripping technique, (v) an energy spectrum window technique, (vi) a time spectrum deconvolution technique, (vii) a time spectrum window technique, or a combination thereof.

Other optional steps may include conducting further operations in dependence upon the property. The further operations may include at least one of: i) geosteering; ii) drilling additional wellbores in the formation; iii) performing additional measurements on the formation; iv) estimating additional parameters of the formation; v) installing equipment in the wellbore; vi) repairing infrastructure; vii) optimizing present or future development in the formation or in a similar formation; viii) optimizing present or future exploration in the formation or in a similar formation; and ix) producing one or more hydrocarbons from the formation.

Other aspects of the present disclosure comprise combined interpretation and joint inversion of evaluation of geometry dimensions, shape and material composition of multiple casing well constructions utilizing multiple independent datasets having different observational physics, such as acoustic, nuclear and electromagnetic data.

General method embodiments include performing an inversion of sensor array casing survey data of multiple downhole casing liners and completion installation components based on the tool as described hereinabove co-located with other casing inspection tools, such as a high definition acoustic beam instrument (e.g., ultrasonic), EM flux inspection tool, and the like. Joint processing of multiple physics, such as, for example, by performing one or more inversions on the datasets (jointly, in series, etc.) may result in more accurate and higher resolution results with respect to estimated structures and their properties (e.g., geometry, materials, defects, etc). Processing may be carried out by an information processing device including a processor and a resident memory for executing programmed instructions, as disclosed herein. Further, joint processing and interpretation of various instrument data may be carried out by using results of inversion of one more observation datasets for further inversions. One or more datasets of previously processed data (e.g., inversion results) may be used to generate constraints and initial conditions for subsequent processing (e.g., inversion) and recurring steps that could use the same data. These inversions may use analytical equations, forward models, or truncated approximations describing the physic behavior to accelerate the processing. In early phases of processing, approximate structural representations may be used as initial conditions.

For example, the initial nuclear or EM-based inversion structure may be defined by high azimuthal definition acoustic information generated with an oriented and rotating beam. That is, a geometric structural description of casing multiple liners and borehole (ID & OD of each casing liner; eccentricity of each liner; shape of each liner; potentially some defects; etc.) may be derived from acoustic data. This acoustically derived geometrical structural description may then be used to interpret data from nuclear or electromagnetic instrumentation measurements performed in the same surrounding media volume, depth location and casing structures.

Joint evaluation may include one dimensional (1D), two dimensional (2D) or three dimensional (3D) imaging processing and/or forward-model based inversion, and so on, and may be complemented with information from other logging auxiliary measurements, such as, for example, for the generation of boundary conditions. The detected beam reflection may be conventionally processed to detect azimuthal thickness of multiple tubulars (e.g., production tubing, first and second casing, etc.) as well as position, cement thickness, borehole diameter, bond quality, and so on. See, for example, U.S. Pat. No. 7,525,872 to Tang et al., U.S. Pat. No. 7,787,327 to Tang et al., U.S. Pat. No. 8,788,207 to Pei et al., U.S. Pat. No. 8,061,206 to Bolshakov, U.S. Pat. No. 9,103,196 to Zhao et al., and U.S. Pat. No. 6,896,056 to Mendez et al., each commonly owned with the present application and incorporated herein by reference in its entirety.

Methods include generating an electromagnetic (EM) field using an EM transmitter of the logging tool to produce interactions between the electromagnetic field and the plurality of nested conductive tubulars; obtaining EM measurements indicative of the interactions; and performing an inversion of the EM measurements using a forward model generated with the property corresponding to each conductive tubular. The interactions may comprise at least one of: i) magnetic flux leakage; and ii) induced eddy currents. Generating the electromagnetic (EM) field may be carried out by exciting an EM field using a first radially oriented EM transmitter at a first polarity and a second radially oriented EM transmitter at a second polarity opposite of the first polarity. Evaluation of the resulting measurements may be carried out in accordance with techniques known to those of skill in the art. See, for example, U.S. Pat. No. 7,403,000 to Barolak et al. and U.S. Pat. No. 7,795,864 to Barolak et al., each incorporated herein by reference in its entirety.

The survey of multiple casing well construction may be used to determine proper acoustic wave frequencies combinations to providing better sounding of multiple casing structure features. Acoustic wave frequencies combinations could be one or more ultra-sonic waves, cross-modulation and/or beating among surveying sonic frequencies.

In some embodiments, the inversion interpretations may initially use single physics datasets, with later recursive inversion steps being performed on pairs of measurement datasets or higher (e.g., three types of measurements can paired and combined in three different sets of pairs). Still later recurring inversion steps may entail performing joint inversion on all available multi-physics datasets computed on a commonly assumed structure and corresponding material properties.

For example, the inversion processing could initially follow a sequential inversion processing flow with sequential inversions of one type of measurement at a time. At a second recurring inversion phase inversion of different pairs of dataset may be performed jointly (dual observational physics inversion). That is two types may be simultaneously inverted at one time with a combined set of results. Gradually, the inversion results will improve, and so will better explain the data with the available forward models.

As assignment of structural and material properties to the structural members is improved in each phase of recurring inversion steps, at a later stage all three multi-physics data may jointly processed.

In other examples, the dimensionality of the physics data type space may be progressively increased in different sequences and combination data sets. Then, in following recurring inversion processing steps, two-type physics are used in action patterns escalating from a single physic processing step to two-physic processing step. In the end, a recurring inversion processing may be employed where three data multi-physics datasets are used in a final inversion. The result of this final inversion would honor all the three multi-physics (nuclear, EM, acoustics) dataset measurement types.

Figure 6A:
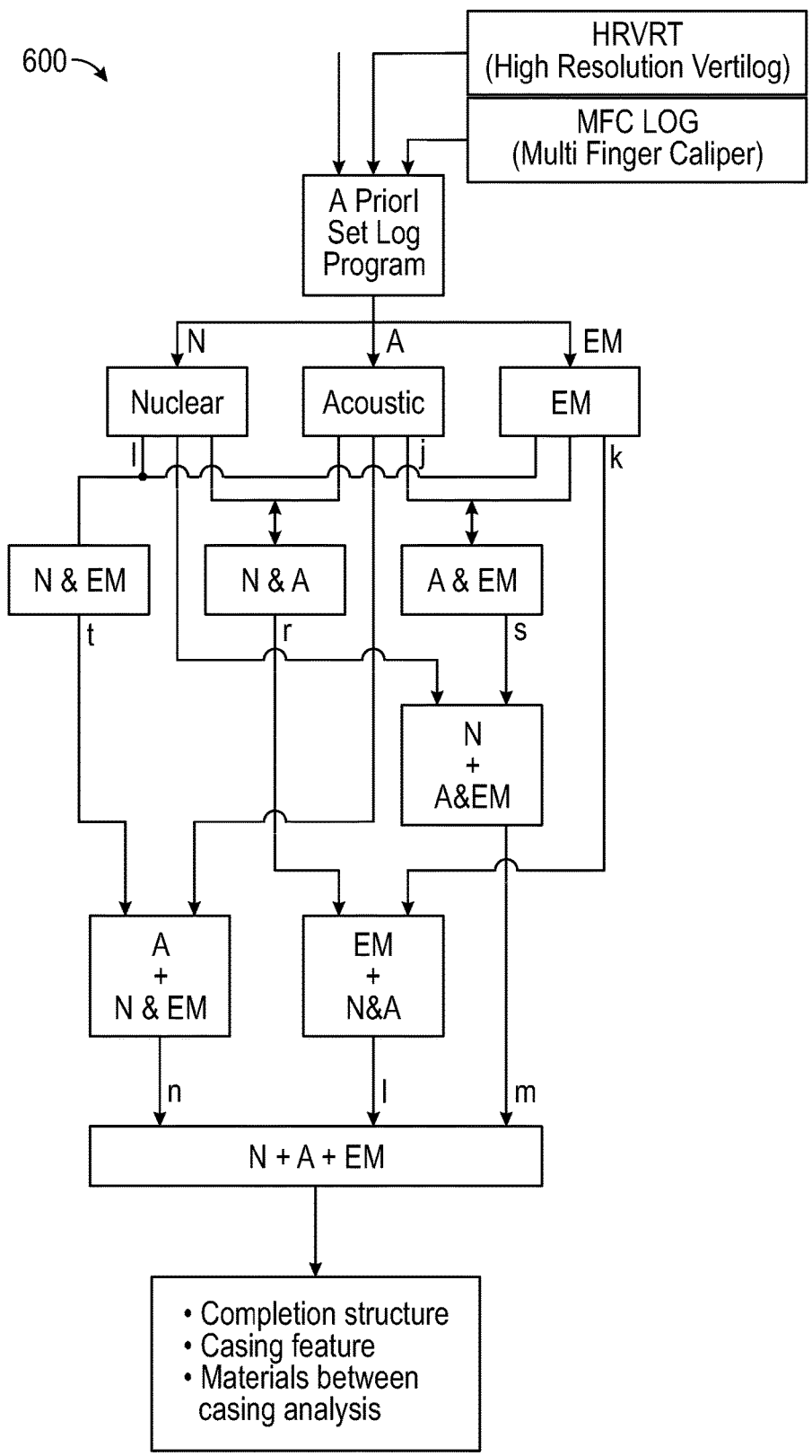
FIG. 6A shows a flow chart illustrating a multiple step, multi-physics forward model-based interpretation method for evaluation of multiple casing well constructions.

FIG. 6A shows a flow chart 600 illustrating a multiple step, multi-physics forward model based interpretation method for evaluation of multiple casing well constructions. A priori data may be considered whenever available for initial inversion solution conditioning. The survey data sets utilized are electromagnetic sensor data (E), acoustic sensor data (A), and nuclear sensor data (N). Nuclear data may be supplied in accordance with the techniques as described above. Non-nuclear data may be obtained using techniques, such as, for example those described by commonly owned U.S. patent application Ser. No. 15/291,797 to Yao et al., "Collocated Multitone Acoustic Beam and Electromagnetic Flux Leakage Evaluation Downhole," herein incorporated by reference in its entirety.

The flowchart illustrates the use of interpretation weights (processing input weights: i, j, k, t, r, s, n, l, m) comprising be a value applied to each of the data sets, or alternatively, multiple dimensions by selective application of different weights to different portions of the dataset. For example, the weighting values may vary from 0 to 1.

Processing may be sequentially performed from the inner casing towards the outer casing. Depending on the weight selection applied, the joint inversion interpretation could be applied in the following sequences and priorities:

i) a priori considerations, applied sequentially in any order of choice to dataset physics sequencing (e.g., A, N, E). The results of one step may be used as a priori data for the next interpretation step (1-1-3; 1-1-2);

ii) a priori considerations, applied to sequential interpretation of results of combinations of two data sets, followed by any other combined two, then a final inversion interpretation step will all three physics datasets;

iii) a priori considerations; sequential interpretation of any one dataset, combined with any other two datasets, final inversion interpretation using all three datasets.

Figure 6B:
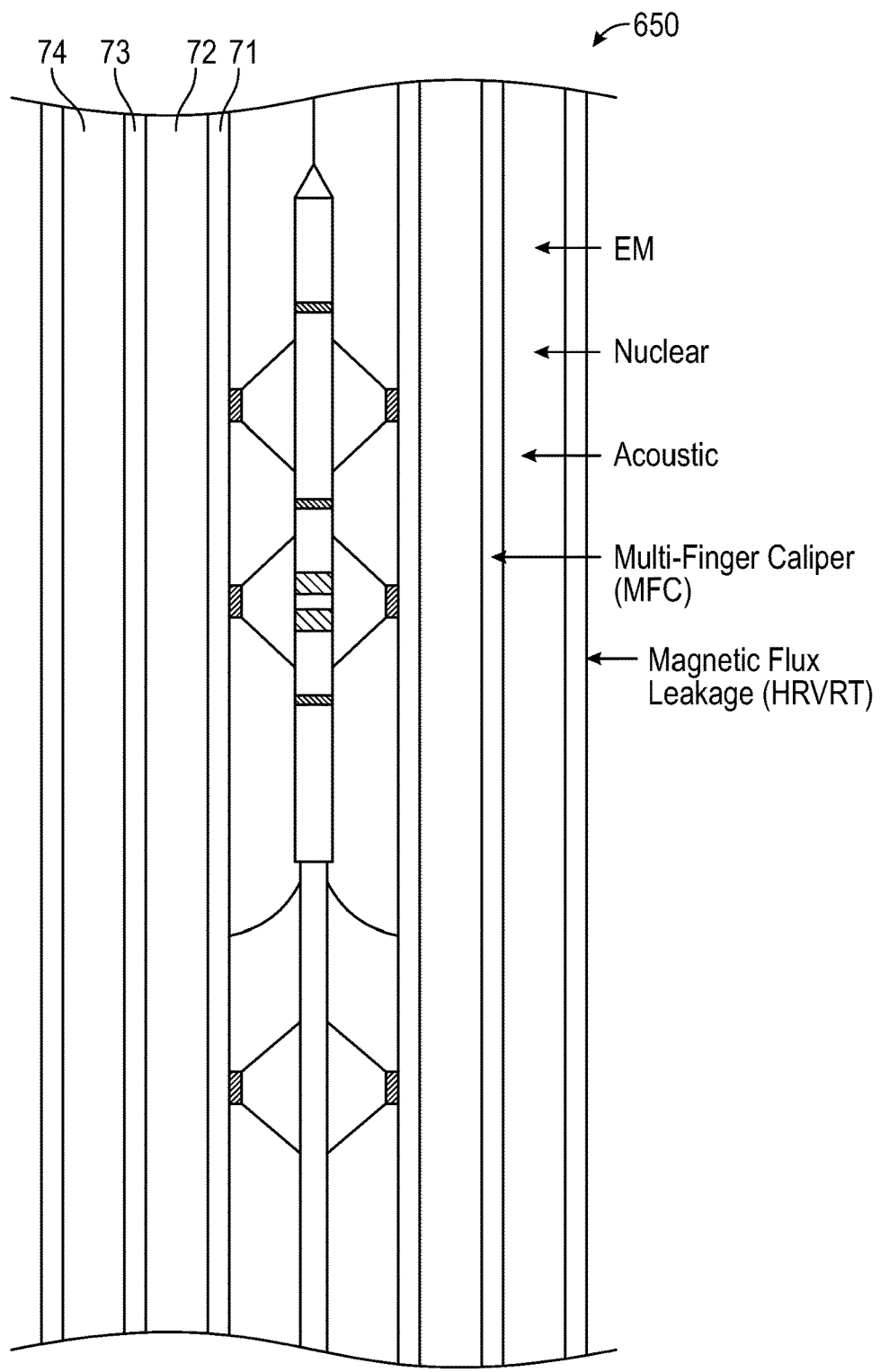
FIG. 6B illustrates a logging tool in accordance with embodiments of the present disclosure.

FIG. 6B illustrates a logging tool in accordance with embodiments of the present disclosure. The tool 600 may be connected with further downhole tools, above and/or below tool 600, such as perforation tools, stimulation tools, milling tools, rollers and so on, as part of a tool string. The tool 600 may be configured for conveyance in nested casing tubular and configured to detect infrastructure components exterior to the first (inner) casing. The tool includes an a transient or multi-frequency EM 3D tool array, a nuclear tool as described above, an acoustic beam transducer assembly, a multi-finger caliper, and a magnetic flux leakage tool.

In operation, the tool may perform magnetic cased well surveys using frequency and spatially focused interpretation and inversion methods using a forward model generated based on knowledge of a specific cased well structure. The interpretation and inversion methods resolve geometry and material properties not defined with a priori knowledge. Acoustic and nuclear data obtained in accordance with the above embodiments may be used to generate the forward model. The 3D tri-axial upper transmitter focuses surveying magnetic fluxes radially into the casing structure to be circulated back through the 3D tri-axial lower transmitter. The 3D EM tri-axial MEMS sensors of array may be configured to sense magnetic flux leakages, current induced magnetic field, and other magnetic flux disturbances of the cased well structure and construction near the inner cased surface ID. The dual transmitter arrangement tri-axially focuses magnetic flux towards the shallower and deeper cased well structures with the assistance of a range of operating frequencies. More complex well structures and features can be surveyed with more data measurements obtained by more sensors, frequencies, transmitters and receiver arrays (pad and tool body mounted), as would occur to those of skill in the art.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The "correction factor" may be applied in additive (or subtractive) or multiplicative fashion to the radiation information. The phrase "substantially the same borehole depth," as used herein, refers to a distance insufficient to produce an influence on the detectors outside the limited aperture volume of interest, such as, for example, within 100 centimeters of axial spacing, within 10 centimeters of axial spacing, within 5 centimeters of axial spacing, within 1 centimeter of axial spacing, or less.

The term "radially oriented" refers to orientation along an axis substantially perpendicular to a longitudinal axis related to the wellbore, such as the borehole itself or that of an elongated tool within the wellbore. The term "limited aperture" as used herein with respect to radiation beam collimation, refers to a beam having a cross section within the furthest measured zone (e.g., at a depth corresponding to cement behind an outer casing) of less than 20 mm, less than 10 mm, less than 5 mm and so on, also known as a pencil beam.

While the foregoing disclosure is directed to the one mode embodiments of the disclosure, various modifications will be apparent to those skilled in the art. It is intended that all variations be embraced by the foregoing disclosure.

What is claimed is:

1. A well logging apparatus comprising:
    a logging tool for conveyance in a wellbore on a carrier comprising:
        a radially oriented limited aperture collimated radiation beam source configured to emit, while in the wellbore, a beam of radiation radially from the logging tool into an elongated volume of interest outside the wellbore such that the beam penetrates a plurality of zones of the volume of interest, wherein each zone of the plurality represents a range of radial depths corresponding to a respective infrastructure component associated with the wellbore;
        a plurality of radiation detectors distributed about the perimeter of the source, wherein each detector of the plurality has a unique angle of detection, the plurality of radiation detectors configured to generate measurement information in response to spatially coherent backscattered gamma rays from the plurality of zones, wherein each detector of the plurality is associated with scattering events at one of the plurality of zones;
        at least one processor configured to take well logging measurements with the logging tool including:
            using the beam source to emit the beam;
            generating measurement information at the plurality of detectors responsive to the emitted beam; and
            estimating a property of the respective infrastructure component at at least one zone using the measurement information.

2. The apparatus of claim 1 wherein the source is at substantially the same borehole depth as the plurality of detectors.

3. The apparatus of claim 1 wherein the volume of interest comprises a plurality of nested tubulars in the wellbore, and the infrastructure component comprises a structural feature relating to at least one tubular of the plurality of nested tubulars.

4. The apparatus of claim 3 wherein at least one tubular of the nested tubulars comprises cement adjacent to casing.

5. The apparatus of claim 3 wherein the property of the respective infrastructure component comprises at least one property of a defect of the component.

6. The apparatus of claim 1 wherein the processor is further configured to identify an anomaly in the infrastructure by detecting attenuated backscatter at a detector correlated with a corresponding zone.

7. The apparatus of claim 1 comprising a carrier, wherein the carrier comprises at least one of i) a drill string; and ii) a wireline.

8. The apparatus of claim 1 wherein the source is within 5 centimeters of axial spacing of the plurality of detectors.

9. A method of well logging using a logging tool in a wellbore in an earth formation, the method comprising:
    conveying the logging tool in the wellbore on a carrier;
    taking well logging measurements with the logging tool including:
        emitting a beam of radiation having high spatial coherency from a source radially from the logging tool into a collimated volume of interest outside the wellbore such that the beam penetrates a plurality of zones of the volume of interest, wherein each zone of the plurality represents a range of radial depths corresponding to a respective infrastructure component associated with the wellbore;
        generating measurement information at a plurality of detectors distributed about the perimeter of the source on the logging tool in response to spatially coherent backscattered gamma rays from the plurality of zones, wherein each detector of the plurality is associated with scattering events at one of the plurality of zones; and
    estimating a property of the respective infrastructure component at at least one zone using the measurement information.

10. The method of claim 9 wherein the volume of interest comprises a plurality of nested tubulars in the wellbore, and the infrastructure component comprises a structural feature relating to at least one tubular of the plurality of nested tubulars.

11. The method of claim 10 wherein at least one tubular of the nested tubulars comprises cement adjacent to casing.

12. The method of claim 11 wherein the property of the respective infrastructure component comprises at least one property of a defect of the component.

13. The method of claim 9 further comprising:
estimating the property of the respective infrastructure component at a zone by using measurement information from another zone closer to a longitudinal axis of the tool than the zone to mitigate effects on measurement information from the zone comprising correcting for an influence of the other zone on the beam.

14. The method of claim 13 comprising performing an inversion on measurement information for at least the zone and the other zone.

15. The method of claim 9 comprising performing an inversion on measurement information for the at least one zone at a plurality of wellbore depths.

16. The method of claim 9 wherein each detector is configured with an angle of detection aligned with a corresponding zone of the plurality of zones.

17. The method of claim 16 further comprising:
identifying an anomaly in the infrastructure by detecting attenuated backscatter at a detector correlated with a corresponding zone.

18. The method of claim 9 comprising:
modeling a predicted signal response for each detector corresponding to at least one anomaly; and
comparing the information with the predicted signal response to identify the anomaly.

19. The method of claim 9 comprising wherein the carrier comprises at least one of i) a drill string; and ii) a wireline.

20. The method of claim 9 comprising conducting further operations in dependence upon the property.

21. The method of claim 20 wherein the further operations comprise at least one of: i) geosteering; ii) drilling additional wellbores in the formation; iii) performing additional measurements on the formation; iv) estimating additional parameters of the formation; v) installing equipment in the wellbore; vi) repairing infrastructure; vii) optimizing present or future development in the formation or in a similar formation; viii) optimizing present or future exploration in the formation or in a similar formation; and ix) producing one or more hydrocarbons from the formation.

22. The method of claim 9 wherein estimating the property of the respective infrastructure component comprises:
performing a joint inversion using the measurement information and additional measurement information from an additional tool comprising at least one of:
i) an electromagnetic tool, and ii) an acoustic tool
to resolve a structural feature relating to at least one tubular of the plurality of nested conductive tubular, the structural feature comprising at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; and viii) a material property of a material surrounding the at least one tubular.

23. The method of claim 9 wherein estimating the property of the respective infrastructure component comprises:
performing a sequential inversion using the measurement information and additional measurement information from an additional tool comprising at least one of:
i) an electromagnetic tool, and ii) an acoustic tool
to resolve a structural feature relating to at least one tubular of the plurality of nested conductive tubular, the structural feature comprising at least one of: i) tubular ovality of the at least one tubular; ii) deformation of the at least one tubular; iii) corrosion of the at least one tubular, iv) perforation of the at least one tubular, v) a presence of a completion component outside of the at least one tubular, vi) eccentricity of the at least one tubular with respect to another component, vii) a material property of the at least one tubular; and viii) a material property of a material surrounding the at least one tubular.

24. The method of claim 9 wherein estimating the property of the respective infrastructure component comprises performing a first inversion, and using the results of the first inversion as a constraint for a second inversion, wherein at least one of the first inversion and the second inversion is performed using the measurement information.

25. The method of claim 9 wherein estimating a property of the respective infrastructure component at the at least one zone further comprises performing a joint inversion with at least additional measurement information from an additional tool comprising at least one of:
i) an electromagnetic tool, and ii) an acoustic tool
and model-based information corresponding to the at least one zone from a model of the volume of interest generated with the measurement information.

26. The method of claim 9 wherein the source is within 5 centimeters of axial spacing of the plurality of detectors.

27. The method of claim 9 wherein estimating the property of the respective infrastructure component comprises:
performing a joint inversion using the measurement information and additional measurement information from an additional tool comprising at least one of:
i) an electromagnetic tool, and ii) an acoustic tool.

28. A well logging apparatus comprising:
a logging tool for conveyance in a wellbore on a carrier comprising:
a radially oriented limited aperture collimated radiation beam source configured to emit, while in the wellbore, a beam of radiation radially from the logging tool into an elongated volume of interest outside the wellbore such that the beam penetrates a plurality of zones of the volume of interest, wherein each zone of the plurality represents a range of radial depths corresponding to a respective infrastructure component associated with the wellbore;
a plurality of radiation detectors, wherein each detector of the plurality has a unique angle of detection, the plurality of radiation detectors configured to generate measurement information in response to spatially coherent backscattered gamma rays from the plurality of zones, wherein each detector of the plurality is associated with scattering events at one of the plurality of zones;
at least one processor configured to take well logging measurements with the logging tool including:
using the beam source to emit the beam;
generating measurement information at the plurality of detectors responsive to the emitted beam; and
estimating a property of the respective infrastructure component at at least one zone using the measurement information;

wherein each detector is configured with an angle of detection aligned with a corresponding zone of the plurality of zones.

29. A method of well logging using a logging tool in a wellbore in an earth formation, the method comprising:
conveying the logging tool in the wellbore on a carrier;
taking well logging measurements with the logging tool including:
emitting a beam of radiation having high spatial coherency radially from the logging tool into a collimated volume of interest outside the wellbore such that the beam penetrates a plurality of zones of the volume of interest, wherein each zone of the plurality represents a range of radial depths corresponding to a respective infrastructure component associated with the wellbore;
generating measurement information at a plurality of detectors on the logging tool in response to spatially coherent backscattered gamma rays from the plurality of zones, wherein each detector of the plurality is associated with scattering events at one of the plurality of zones; and
estimating a property of the respective infrastructure component at at least one zone using the measurement information;
wherein the volume of interest comprises a plurality of nested tubulars in the wellbore, and the infrastructure component comprises a structural feature relating to at least one tubular of the plurality of nested tubulars.

30. A method of well logging using a logging tool in a wellbore in an earth formation, the method comprising:
conveying the logging tool in the wellbore on a carrier;
taking well logging measurements with the logging tool including:
emitting a beam of radiation having high spatial coherency radially from the logging tool into a collimated volume of interest outside the wellbore such that the beam penetrates a plurality of zones of the volume of interest, wherein each zone of the plurality represents a range of radial depths corresponding to a respective infrastructure component associated with the wellbore;
generating measurement information for the at least one zone at a plurality of well bore depths at a plurality of detectors on the logging tool in response to spatially coherent backscattered gamma rays from the plurality of zones, wherein each detector of the plurality is associated with scattering events at one of the plurality of zones; and
estimating a property of the respective infrastructure component at at least one zone using the measurement information comprising performing an inversion on the measurement information for the at least one zone at a plurality of well bore depths.

* * * * *